(12) United States Patent
Thakur

(10) Patent No.: US 6,448,621 B1
(45) Date of Patent: Sep. 10, 2002

(54) SENSOR APPARATUS USING AN ELECTROCHEMICAL CELL

(76) Inventor: Mrinal Thakur, 1309 Gatewood Dr., Apt. 1703, Auburn, AL (US) 36830

( * ) Notice: Subject to any disclaimer, the term of this patent is extended or adjusted under 35 U.S.C. 154(b) by 0 days.

(21) Appl. No.: 09/586,209

(22) Filed: Jun. 2, 2000

Related U.S. Application Data

(60) Provisional application No. 60/137,763, filed on Jun. 4, 1999.

(51) Int. Cl.$^7$ .................................................. H01M 4/86
(52) U.S. Cl. ........................ 257/414; 429/303; 429/307; 205/343
(58) Field of Search ................................. 257/417, 414; 205/343; 204/194, 410; 320/101; 429/12, 42, 303, 307; 524/418, 104, 108; 359/265, 270

(56) References Cited

U.S. PATENT DOCUMENTS

| | | | | |
|---|---|---|---|---|
| 5,885,468 A | * | 3/1999 | Kozlowski | 216/2 |
| 6,156,449 A | * | 12/2000 | Zuber | 429/42 |
| 6,159,352 A | * | 12/2000 | Riera | 204/530 |
| 6,160,278 A | * | 12/2000 | Liu | 257/252 |
| 6,245,847 B1 | * | 6/2001 | Green | 524/418 |

FOREIGN PATENT DOCUMENTS

JP 406151997 A * 5/1994

* cited by examiner

*Primary Examiner*—Olik Chaudhuri
*Assistant Examiner*—Nathan W. Ha
(74) *Attorney, Agent, or Firm*—Harold L. Marquis, Esq.

(57) ABSTRACT

A novel technology for sensing mechanical quantities such as force, stress, strain, pressure and acceleration has been invented. This technology is based on a change in the electrochemically generated voltage (electromotive force) with application of force, stress, strain, pressure or acceleration. The change in the voltage is due to a change in the internal resistance of the electrochemical cell with a change in the relative position or orientation of the electrodes (anode and cathode) in the cell. The signal to be detected (e.g. force, stress, strain, pressure or acceleration) is applied to one of the electrodes to cause a change in the relative position or orientation between the electrodes. Various materials, solid, semisolid, gel, paste or liquid can be utilized as the electrolyte. The electrolyte must be an ion conductor. The examples of solid electrolytes include specific polymer conductors, polymer composites, ion conducting glasses and ceramics. The electrodes are made of conductors such as metals with dissimilar electronegativities. Significantly enhanced sensitivities, up to three orders of magnitude higher than that of comparable commercial sensors, are obtained. The materials are substantially less expensive than commercially used materials for mechanical sensors.

6 Claims, 3 Drawing Sheets

SENSOR APPARATUS USING AN ELECTROCHEMICAL CELL

CROSS-REFERENCE TO RELATED APPLICATION

The present application claims the benefit of co-pending U.S. Provisional Patent Application Ser. No. 60/137,763 filed Jun. 4, 1999, which is incorporated by reference in its entirety herein.

STATEMENT OF GOVERNMENT SUPPORT

This invention was made with government support under DE-FC02-91-ER75678, Amendment No. A006 awarded by Department of Energy through the Alabama DOE/EPSCoR Program. The government has certain rights in the invention.

FIELD OF THE INVENTION

The present invention relates to sensor technology. More particularly, the present invention relates to mechanisms for sensing such quantities as stress, strain, force, pressure and acceleration based on a change in electrochemically generated voltage with application of stress, strain, force, pressure or acceleration

BACKGROUND OF THE INVENTION

Sensors play a vital role in today's technology.[1-3] There is a great demand for sensors of stress, strain, force, pressure and acceleration. The mechanisms and methods that are usually used for sensing these quantities include: piezoelectric, piezoresistive, capacitive and fiber-optic.[1-3] These technologies have their advantages and disadvantages. The piezoelectric sensors rely on a generation of charges or a voltage when a stress or strain is applied. The piezoresistive sensors are based on a change in resistivity in a semiconductor with an applied stress or strain. The capacitive sensor relies on a change in capacitance as a stress or strain is applied on one of the electrodes of the capacitor thereby changing the separation of the electrodes. The fiber-optic sensors sense a change in light transmission through optical fiber when a stress or strain is applied. The best piezoelectric material is PZT which is a ceramic material. Piezoelectricity is a transient effect and produces little change if a constant stress or strain is applied. The ceramic material is brittle and relatively expensive. The polymer PVDF is also a piezoelectric material but has a much smaller piezoelectric coefficient than PZT and both the ceramic and polymer materials need to be poled at a high temperature to obtain the piezoelectric behavior. The best piezoresistive material is silicon which is relatively expensive and brittle and piezoresistivity is temperature sensitive. The capacitive sensors have high sensitivity but a smaller range of operation providing linearity. The fiber-optic sensors can be too sensitive to temperature fluctuation. In any case, the world market in sensors is expanding at a rapid pace and has already exceeded ten billion U.S. dollars. Novel sensor technologies providing highly sensitive, inexpensive and more versatile sensors than presently available can make an immediate impact in this market.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
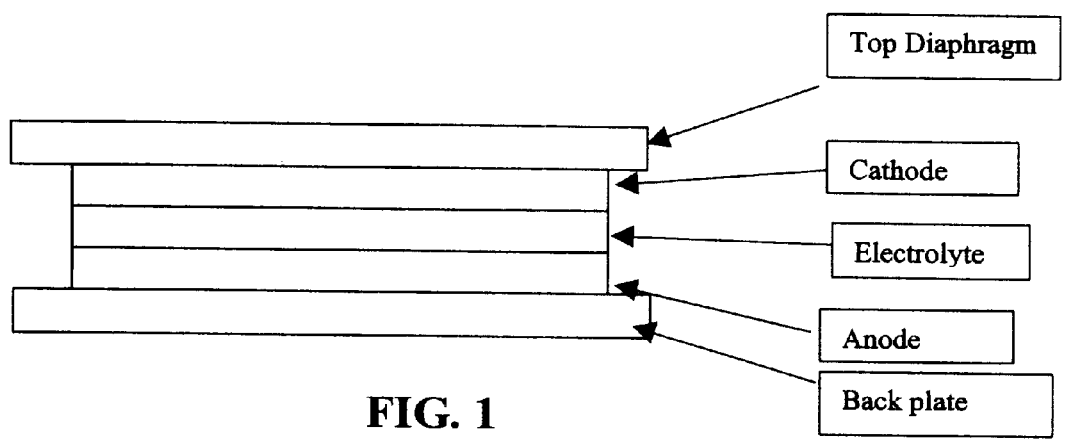
FIG. 1 is a schematic of the device structure of a sensor involving a solid electrolyte.

The present invention involves an entirely different mechanism for sensing such quantities as stress, strain, force, pressure and acceleration than the mechanisms discussed above. The sensing in this novel technology is based on a change in electrochemically generated voltage with application of stress, strain, force, pressure or acceleration. The change in the electromotive force or voltage of the electrochemical cell results from a change in the internal resistance which is caused by a change in the relative position or orientation between the electrodes. The generic device configuration is discussed below.

The device essentially involves a standard electrochemical cell including an anode, a cathode and an electrolyte between the electrodes. The electrodes are made of metals or conductors of dissimilar electronegativities. The electrolyte is an ion conductor in the solid, semisolid, gel, paste or liquid state. The overall designs or geometries of the device can be varied. For example, one of the electrodes can be mounted on a thin (plastic or other material) and tough diaphragm which receives and transfers the applied stress, strain, force, pressure or acceleration to the electrolyte. As the diaphragm, for example, depresses the electrolyte, the separation between the electrodes decreases and thereby a change in internal resistance is caused and that leads to a change in the electromotive force (voltage) of the cell. This change in the voltage is directly recorded or displayed using an oscilloscope for different magnitudes of stress, strain, force, pressure or acceleration. Thus the overall construction and operation of such a sensor is very simple and straightforward. The device does not need any external power source (voltage or current) to operate. The sensor responds to both static and dynamic loading (note: piezoelectric sensors do not respond to a static loading). Very high sensitivity can be achieved even without using an amplifier. Thus, these are clear advantages over the existing technologies of sensing involved in piezoresistive, piezoelectric, capacitive and fiber-optic sensing systems. In addition, the examples of sensors discussed in the present invention involve polymer electrolytes which are very inexpensive and easy to process as large area thin films. Polymers such as poly(ethylene oxide), poly(propylene oxide), 1,4 cis-polyisoprene doped with lithium perchlorate are some of the examples discussed in this patent application. However, this invention is in no way limited to polymer electrolytes. Other electrolytes including specific inorganic solids, pastes, gels and liquids that can be configured to receive and react to the stress, strain, force, pressure and acceleration signals reversibly and reproducibly are also covered within this invention. The devices based on this technology is expected to be significantly less expensive than relevant commercial devices. The invention will be further described in connection with the following examples, which are set forth for purposes of illustration only. Parts and percentages appearing in such examples are by weight unless otherwise stipulated.

EXAMPLES OF DEVICE CONFIGURATIONS:

1) The electrolyte under consideration (e.g. polyethylene oxide doped with lithium perchlorate) is spread as a uniform film on a thin sheet of metal (e.g. aluminum foil). Alternatively, a thin film of the electrolyte (e.g. nation, commercially available) is placed on a thin sheet of metal. Then another metal electrode with a dissimilar electronegativity (e.g. gold) is evaporated on top of the electrolyte. Alternatively a copper tape can be overlaid on the electrolyte film. Thus an electrochemical cell is constructed including the anode and cathode facing each other with the electrolyte in between. The whole assembly can now be transferred to a plastic or metal housing with a thin plastic sheet acting as the receptor and transmitter of the external stimuli (force, stress, strain, pressure and acceleration). The top plastic or metal cover is in intimate contact with the top electrode. This is the basic configuration (FIG. 1).

2) The electrolyte is uniformly dispersed in a solid matrix (e.g. crosslinked natural rubber, paper), and a thin film of that composite is placed in intimate contact with a thin sheet of a metal (e.g. aluminum foil). The matrix containing the electrolyte is covered with another metal of a dissimilar electronegativity (e.g. copper) (FIG. 1).

Figure 2:
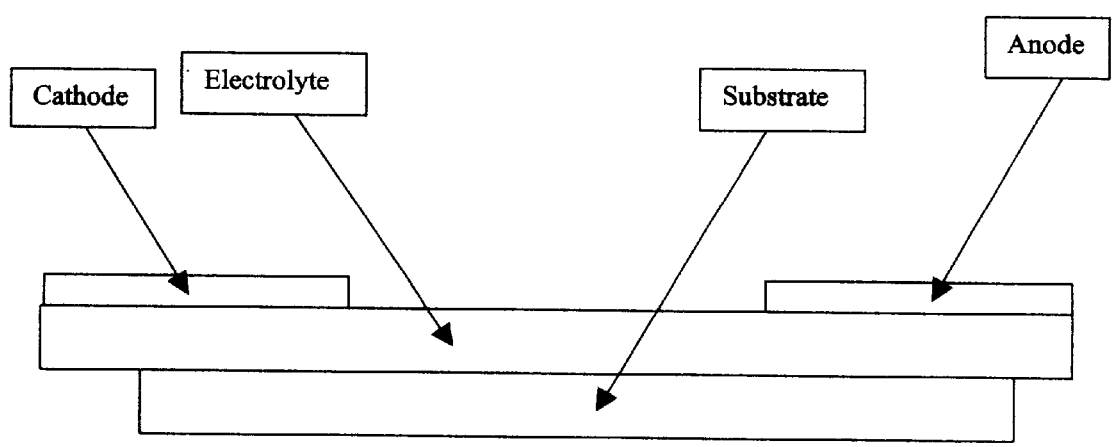
FIG. 2 is a schematic of a sensor with electrodes deposited in a side-by-side structure

3) Alternatively, the electrolyte can be coated on the surface (e.g. silicon chip) that needs to be monitored for stress or strain distribution. A metal electrode (e.g. aluminum foil) is applied and then another metal electrode with a dissimilar electronegativity (e.g. a copper tape) is applied side-by-side on the substrate. Then the electrolyte film coated covering the two electrodes to form an electrochemical cell (FIG. 2).

4) An electrochemical cell consisting of a liquid electrolyte and two metal electrodes of dissimilar electronegativities is constructed. One of the electrodes (triangular shape with the tip touching the liquid) is movable up and down into the electrolyte so that its contact surface area with the electrolyte can be varied. As that electrode is inserted inside the electrolyte resulting in a larger area of contact, the internal resistance is reduced and thus causing an increase in the voltage output. This movable electrode can be connected to a spring or any other restoring mechanism so that the electrode returns to its original position as the applied stress or force is removed.

The above exemplary device structures, 1) and 2), can be replicated and stacked in series to give even higher sensitivity than an individual device. The emphasis of the present invention is on the basic concept involving a modified configuration of an electrochemical cell to use it as a highly sensitive sensor and the scope of this invention is by no means limited to the examples of the device designs discussed above.

Electrical connection is made to the anode and cathode using a coaxial cable and the cell voltage is monitored using an oscilloscope. For calibration purposes, a shaker is used to apply a known magnitude of force on the top electrode (configuration (i)) and the change in the electromotive force in the cell is recorded in the oscilloscope. Due to the small thickness of the film, side-by-side as opposed to face-to-face configuration of the electrodes and the distance between the electrodes in device configuration 3), the internal resistance is high. Then a charge amplifier similar to piezoelectric sensors is used to display the output of the device in the oscilloscope.

MATERIALS

A broad range of materials can be useful in this novel technology. Examples of materials used to demonstrate this technology include: polymer electrolytes such as polyethylene oxide doped with lithium perchlorate, polypropylene oxide doped with lithium perchlorate, nafion (perfluorosulfonate based electrolytes),[4] semiconducting polymers such as doped polyaniline, and 1,4 cis-polyisoprene in the latex or crosslinked form doped with lithium perchlorate. Many other similar ion conducting doped polymers will be operative in this technology.[4] In principle, any electrolyte (paste, gel, liquid, semisolid, solid) used in commercial batteries, in appropriate device configuration, can be used in this application. Composites of polymer electrolytes in a flexible polymer matrix (e.g. crosslinked natural rubber) are excellent choices. In addition, ion conducting ceramics and glasses[4] in the form of composite in a polymer matrix can also be used as electrolytes in these devices. Various metallic and nonmetallic electrodes of different electronegativities can be used for fabrication of these sensors. The choice of metals and the ion mobility in the electrolyte are important to maximize the sensitivity. Similar to batteries, the wider the difference in electronegativities of the metals the larger is the output voltage. Just as in the case of batteries, the devices need to be hermetically sealed to obtain the longest lifetime for use in sensing.

SENSITIVITY

Figure 3:
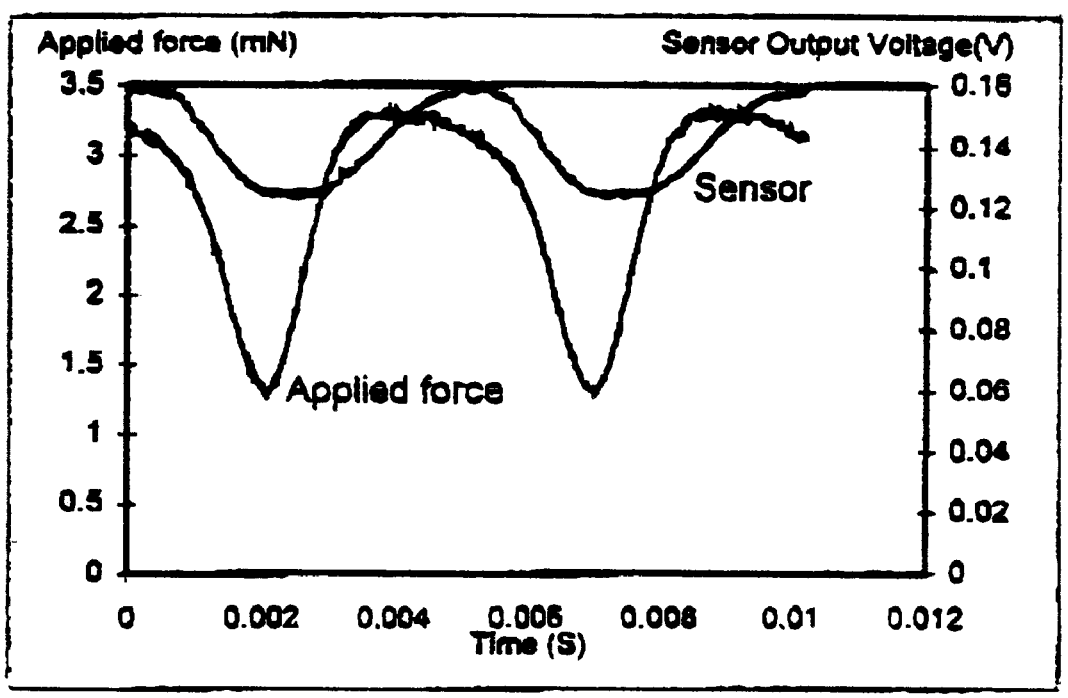
FIG. 3 is a graph of the sensor output characteristics for different magnitudes of applied forces.

As stated earlier, the sensors in the technology discussed in this patent are highly sensitive. An output (change in voltage) as large as 15 mV for a force of 0.8 millinewton ($0.8 \times 10^{-3}$N) has been achieved in polyethylene oxide lithium perchlorate based sensors without using any amplifier. The measured sensor output as a function of force for such a device is attached (FIG. 3). The device configuration (1 and 2) for this measurement involved a parallel arrangement (FIG. 1) of the anode, cathode and the electrolyte film (polyethylene oxide+lithium perchlorate in a natural rubber matrix). Using this device, a force as small as about $5 \times 10^{-5}$N should be possible to detect. Using appropriate amplifiers a force as small as one micronewton ($10^{-6}$N) should be possible to measure. The smallest force that the available commercial sensors can measure is about one millinewton ($1 \times 10^{-3}$N). Thus the sensors discussed in this patent have up to about 3 orders of magnitude higher sensitivity.

For the configuration involving electrodes deposited side-by-side in contact with the polymer electrolyte film (e.g. polyethylene oxide+lithium perchlorate in 1,4 cis-polyisoprene), the internal impedance is larger and the voltage output should be amplified using a charge amplifier and then displayed on the oscilloscope. This sensor configuration is similar to that of silicon piezoresistive sensors used in detecting stress distributions on silicon chips except the fact that in a piezoresistive sensor a change in resistivity is used as the detected signal. In our devices a change in voltage or charge is used for such detection. The sensitivity of these novel sensors is significantly higher than that of silicon sensors which are known to have extensive commercial usage.

Depending on the materials, solid, semi-solid, gel, paste or liquid, different sensitivities, advantages and disadvantages in device performance can be expected. The examples of materials discussed above include polymer electrolytes and composites. We have demonstrated proof-of-the-principle devices using liquid electrolytes (e.g. lithium perchlorate in water solution) as well.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications or publications referred to herein are incorporated by reference in their entirety.

REFERENCES

1. *Sensor Technology and Devices*, ed. Ljubisa Ristic, Artech House, Norwood, Mass, 1994.

2. *Semiconductor Sensors*, ed. S. M. Sze, John Wiley & Sons, New York, 1994.

3. *AIP Handbook of Modern Sensors*, Jacob Fraden, American Institute of Physics, New York, 1993.

4. *Polymer Electrolytes*, F. M. Gray, The Royal Society of Chemistry, Cambridge, UK, 1997.

ADVANTAGES AND FEATURES OF THE INVENTION

1) A novel technology for sensing mechanical quantities such as force, stress, strain, pressure and acceleration has been invented.

2) This technology is based on the novel idea that the electromotive force (voltage output) of an electrochemical cell (battery) changes as the relative position or configuration of the electrodes change. The electrodes are in contact with an electrolyte as in a typical electrochemical cell.

3) The electrodes (anode and cathode) consist of metals or other conductors of dissimilar electronegativities.

4) The electrolytes can be any ion conductor based on organic or inorganic materials such as polymers, polymer composites, ion conducting glasses and ceramics, gels, pastes or liquids.

5) Various device configurations can be constructed involving the basic elements: an electrolyte, an anode and a cathode.

6) The two electrodes can be parallel and opposing with the electrolyte between them and in contact.

7) The electrodes can be deposited side-by-side and connected to the electrolyte film. If the electrolyte is a solid such as a polymer or polymer composite electrolyte, the restoring force is provided by the elasticity of the material. For semisolid, gel, and paste electrolytes, a configuration (e.g. a spring) that provides a restoring force is needed for device operation.

9) The force, pressure, stress, strain or acceleration signal applied on one of the electrodes changes the relative position or configuration between the electrodes, leading to a change in the internal resistance of the cell and thus a change in the voltage output is obtained. The voltage (sensor signal) is measured in an oscilloscope or a voltmeter.

10) For the side-by-side configuration, a charge amplifier is used to record the voltage or sensor signal.

11) The sensitivity measured for the parallel electrode configuration is up to about three orders of magnitude higher than a comparable commercial sensor for measurements of mechanical quantities.

12) The sensitivity of the sensor constructed in the side-by-side construction is significantly higher than that of a commercial silicon piezoresistive sensor. The side-by-side configuration is relevant to stress sensor applications in silicon chips.

What is claimed is:

1. An apparatus for sensing mechanical quantities of force, stress, strain, pressure, and acceleration, comprising:
   e. an electrochemical cell comprising an anode and a cathode constructed of metals or other conductors of dissimilar electronegativitities; and,
   f. an electrolyte selected from the group consisting of polymers, polymer composites, ion conducting glasses and ceramics, gels, pastes and liquids, such that said two electrodes can be parallel and opposing with said electrolyte between them and in contact with a diaphragm in contact with one of the electrodes, whereby force, pressure, stress, strain or acceleration signal applied on the diaphragm changes the relative position or configuration between the electrodes, leading to a change in the internal resistance of the cell and causing a change in the voltage output.

2. The apparatus of claim 1 in which the electrolyte is polyethylene oxide doped with lithium perchlorate.

3. The apparatus of claim 1 in which the electrolyte is nafion.

4. The apparatus of claim 1 in which the electrolyte is a doped polyaniline.

5. The apparatus of claim 1 in which the electrolyte is a 1,4 cis-polyisoprene in the crosslinked form doped with lithium perchlorate.

6. An apparatus for sensing mechanical quantities of force, stress, strain, pressure, and acceleration, comprising:
   a. an electrochemical cell comprising an anode and a cathode constructed of metals or other conductors of dissimilar electronegativitities; and,
   b. an electrolyte selected from the group consisting of polymers, polymer composites, ion conducting glasses and ceramics, gels, pastes and liquids, such that said two electrodes have an electrolyte between them and in contact, whereby force, pressure, stress, strain or acceleration signal applied on one of the electrodes changes the relative position or configuration between the electrodes, leading to a change in the internal resistance of the cell and causing a change in the voltage output.

* * * * *